(12) United States Patent
Boyle (10) Patent No.: US 9,670,977 B2
(45) Date of Patent: Jun. 6, 2017

(54) HIGH-LOW PAD RETRACTION SPRING

(71) Applicant: AKEBONO BRAKE INDUSTRY CO., LTD, Chuo-ku, Tokyo (JP)

(72) Inventor: Brian Lewis Boyle, Farmington Hills, MI (US)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 134 days.

(21) Appl. No.: 14/483,461

(22) Filed: Sep. 11, 2014

(65) Prior Publication Data

US 2016/0076611 A1    Mar. 17, 2016

(51) Int. Cl.
*F16D 65/097* (2006.01)
*F16D 65/02* (2006.01)

(52) U.S. Cl.
CPC ..... *F16D 65/0972* (2013.01); *F16D 65/0978* (2013.01); *F16D 2065/1396* (2013.01)

(58) Field of Classification Search
CPC ............ F16D 65/0972; F16D 65/0978; F16D 65/0979; F16D 2055/0041; F16D 2065/1396
See application file for complete search history.

(56) References Cited

U.S. PATENT DOCUMENTS

| | | | |
|---|---|---|---|
| 4,467,897 A * | 8/1984 | Kubo | F16D 55/227 188/205 A |
| 4,704,057 A * | 11/1987 | McSherry | F16B 13/0808 411/344 |
| 7,040,464 B1 * | 5/2006 | Andrews | F16D 65/0978 188/73.38 |
| 7,798,294 B2 | 9/2010 | Iraschko | |
| 7,810,617 B2 * | 10/2010 | Vanouche | F16D 55/227 188/73.35 |
| 8,376,092 B2 | 2/2013 | Lethorn | |
| 8,393,441 B2 | 3/2013 | Gutelius | |
| 8,397,880 B2 | 3/2013 | Chelaidite | |
| 2004/0256183 A1 | 12/2004 | Barbosa et al. | |
| 2008/0087506 A1 * | 4/2008 | Vanouche | F16D 55/227 188/73.31 |
| 2012/0222925 A1 | 9/2012 | Kaneko | |
| 2014/0209420 A1 * | 7/2014 | Jaeger | F16D 55/22 188/72.1 |
| 2014/0305753 A1 | 10/2014 | Macy et al. | |
| 2014/0339026 A1 | 11/2014 | Gutelius et al. | |

FOREIGN PATENT DOCUMENTS

| | | | | |
|---|---|---|---|---|
| FR | WO 2006040428 A1 * | 4/2006 | .......... | F16D 55/227 |
| JP | 08-284983 | 1/1996 | | |

* cited by examiner

*Primary Examiner* — Anna Momper
(74) *Attorney, Agent, or Firm* — The Dobrusin Law Firm, P.C.

(57) ABSTRACT

A device comprising a connection plate having a first end and a second end and two or more spring arms connected to and extending from the second end of the connection plate at an angle and having a portion that extends back toward the connection plate, wherein the two or more spring arms, when moved during a brake apply, provide an axial force toward the connection plate. The device may be used within a brake assembly, which further includes a caliper; a support bracket having a leading end and a trailing end, wherein the leading end, the trailing end, or both, have one or more projections; a rotor extending through the support bracket; and two or more brake pads located within the support bracket on opposing sides of the rotor.

20 Claims, 9 Drawing Sheets

HIGH-LOW PAD RETRACTION SPRING

FIELD

The present teachings generally relate to a pad clip for a brake system and more particularly a pad retraction spring that assists in evenly retracting the brake pads.

BACKGROUND

Typically, disc brake systems include a support bracket, two or more brake pads, a caliper, and a rotor. The two or more brake pads are mounted and located adjacent to the support bracket so that the brake pads move axially, along the rotor axis, a piston bore axis, or both, towards and away from the rotor. The disc brake system may include a pad clip that attaches to the brake system between the support bracket and the brake pads so that the brake pads are retained within the brake system and move along the pad clip. The disc brake system may include one or more springs to assist in retracting the brake pads away from a rotor when the brakes are released, and the one or more springs may abut against or be secured to a portion of the support bracket. Examples of springs and pad retraction devices are disclosed in U.S. Pat. Nos. 8,376,092; 8,397,880; and 8,399,441; and U.S. Patent Application Publication No 2012/0222925 all of which are expressly incorporated herein by reference for all purposes.

One challenge faced by retraction springs is that the springs may allow a portion of the brake pads to tip slightly toward the rotor. For example, a retraction spring may contact a brake pad above or below a longitudinal center line of the brake pad. As the spring contacts the brake pad and assists the brake pad in retracting, force may not be adequately distributed along the brake pad so that the brake pad may not retract evenly. A portion of the brake pad (i.e., above or below a longitudinal center line) may tilt toward the rotor, which may result in incidental contact between the pad and rotor; causing uneven wear of the rotor, uneven wearing of the friction material of the brake pad, an increase in residual (brakes off) drag, and rattle noise.

There is a need for a retraction spring design that applies a consistent force to the brake pads throughout wearing of the brake pad; reduces or prevents pad tipping or rotation along a longitudinal axis of the brake pad; assists in providing an even brake pad retraction; reduces air gap; or a combination thereof.

SUMMARY

The present teachings provide one or more solutions to the needs above by providing a spring that includes two or more spring arms to reduce or prevent tilting of the brake pad during retraction, running, or a condition there between; increase air gap; evenly retract a brake pad in an axial direction relative to the axis of the rotor so that the face of the brake pad and the face of the rotor remain substantially parallel; reduce uneven wearing of the rotor, friction material of the brake pad; or combination thereof.

One possible embodiment of the present teachings include a device comprising a connection plate having a first end and a second end and two or more spring arms connected to and extending from the second end of the connection plate at an angle. The two or more spring arms may have a portion that extends back toward the connection plate. The two or more spring arms, when moved during a brake apply, may provide an axial force toward the connection plate.

Another possible embodiment of the present teachings include a brake assembly including a pad retraction spring. The brake assembly may comprise a caliper; a support bracket having a leading end and a trailing end, wherein the leading end, the trailing end, or both, have one or more projections; a rotor extending through the support bracket; two or more brake pads located within the support bracket on opposing sides of the rotor; and one or more pad retraction springs. The pad retraction spring may include a connection plate having a first end and a second end, wherein the connection plate is located on a pressure plate side of the one or more projections of the support bracket; and two or more spring arms connected to and extending from the second end of the connection plate, wherein the spring arms include two or more segments joined by a biasing portion and forming an angle. The connection plate and at least a portion of the two or more spring arms may be located on opposite sides of one of the two or more brake pads. During a brake apply, the two or more spring arms may provide an axial force toward the connection plate.

One unique aspect of the present teachings envision a pad retraction spring that includes at least two spring arms. The two spring arms may contact a brake pad so that the rotation along a longitudinal axis extending through a midpoint of the brake pad is prevented. A first spring arm may maintain contact with the brake pad above the longitudinal axis of the brake pad and a second spring arm may maintain contact with the brake pad below the longitudinal axis of the brake pad.

Another unique aspect of the present teachings envision the spring arms, comprising a projection portion and a brake pad, portion connected by a biasing portion. The projection portion may include multiple segments, such as, but not limited to: a connection segment connected to and extending from the second end of the connection plate; an angled segment connected to and extending from the connection segment and generally angled toward another of the two or more spring arms; and a contact segment connecting the angled segment with the biasing portion. The brake pad portion may include multiple segments, such as, but not limited to; a body segment connected to and extending form the biasing portion back toward the connection plate; a transition segment connected to and extending from the body segment; and a curved segment extending from the transition segment.

DETAILED DESCRIPTION

The following description of the preferred embodiment(s) is merely exemplary in nature and is in no way intended to limit the teachings, its application, or uses.

The present teachings are predicated upon providing an improved brake assembly for use with vehicles. For example, the brake assembly may be used with almost any vehicle (e.g. car, truck, bus, train, airplane, or the like). Alternatively, the brake assembly may be integrated into components used for manufacturing or other equipment that require a brake such as a lathe, winder for paper products or cloth, amusement park rides, or the like. However, the present teachings are most suitable for use with a passenger vehicle (i.e. a car, truck, sport utility vehicle, or the like).

The present teachings provide a brake assembly that may be used to create a braking force. Generally, a brake assembly includes a caliper body, a rotor, a support bracket, and one or more brake pads.

The caliper may function to support one or more brake pads within a brake system, house one or more pistons, axially move, assist in creating a brake apply, or a combination thereof. The caliper may be connected to a knuckle via the support bracket or the caliper may be directly connected to the knuckle. The caliper body may include a bridge, one or more fingers, one or more piston bores, or a combination thereof. The caliper may include one or more pistons that move during a brake apply to create a friction force. The caliper may include one or more piston bores that each house a piston. Each of the pistons may extend along the piston bore axis to create a brake apply. The one or more piston bores that house the one or more pistons may include any, all, or a combination of a fluid inlet, a closed wall, a front opening, a cylindrical side wall that includes an annular groove near the front opening, and a seal in the annular groove. The caliper may include one or more pistons on each side of the caliper so that the caliper is substantially static during a brake apply (e.g., a fixed caliper). The brake assembly may include opposing pistons. Preferably, the brake assembly includes one or more pistons on one side of a rotor so that when the piston moves a brake pad into contact with a rotor, the caliper moves until fingers move an opposing brake pad into contact with an opposing side of the rotor (e.g., a floating caliper).

The support bracket may function to connect the brake system to a corner module (e.g., a knuckle). The support bracket may be any static part of the brake system. The support bracket may directly or indirectly support the brake pads. The support bracket may include one or more pad clips that assist in holding the one or more brake pads. The caliper and the support bracket may be one unitary piece. The support bracket and caliper may be two discrete pieces. The support bracket may connect the caliper indirectly to a corner module. The support bracket may provide support to the caliper so that the caliper moves during a brake apply. The support bracket may be sized so that the caliper extends on both sides of the support bracket and a rotor extends through a center of the support bracket. Preferably, the support bracket includes at least two opposing projections and/or at least two opposing abutments that guide the brake pads during a brake apply and retain the brake pads within the support bracket during non-braking conditions (e.g. running). A pair of brake pads may be used in the brake assembly, and the pair of brake pads may extend from an abutment on a trailing end of the support bracket to an abutment on a leading end of the support bracket. The support bracket may have two projections on the leading end and two opposing projections on the trading end. The projections may be separated by a gap that accommodates the rotor. Each projection may have a friction material side (e.g., facing toward the rotor) and a pressure plate side (e.g., facing away from the rotor) connected by a front face. The front face may be generally perpendicular to the friction material and pressure plate sides of the projection.

The caliper body may be in communication with one or more brake pads (e.g., an inboard brake pad and an outboard brake pad that are on opposing sides of the rotor). The brake pads may function to create a friction force during a brake apply. The brake pads may function to be axially moved during a brake apply, a brake retract, or both. The brake pads may include a pressure plate and friction material. The brake pads may include a pressure plate with friction material on at least a portion of one side of the pressure plate. During a brake apply, the friction material contacts the rotor of the brake assembly to slow the vehicle or bring it to a stop. The friction material may cover only a portion (e.g., not the entire side) of the pressure plate so that some of the pressure plate on that side is exposed. The brake pad (e.g., pressure plate, friction material, or both) may have a shape that allows at least a portion of the retraction spring disclosed herein to pass from one side of the brake pad to the other (e.g., a cutout or contour). For example, the brake pad may have a contour that allows a portion of one or more spring arms of the pad retraction spring to pass between the support bracket and the brake pad.

The brake pads may be held in communication with the support bracket with one or more pad clips. The one or more pad clips, and preferably a plurality of pad clips, may function to hold one or more brake pads, allow one or more brake pads to move along an axis of a rotor (e.g., an axis around which the rotor rotates), create a low friction surface for the brake pads to move along, assist in retraction of a brake pad, or a combination thereof. Preferably, the pad clips generally match the shape of a portion of the support bracket (e.g., having an ear portion shaped to fit within an abutment of the support bracket, around at least a portion of a projection, or both), have a generally complementary shape to a portion of the brake pad, or both. The pad clip may be made of separate pieces. The pad clip may be a unitary piece. The pad clip may include a bridge that extends over the rotor to join the pad clip bodies at each projection and/or abutment on one end of the support bracket. Preferably at least one pad clip is placed on one side (e.g., leading end) of the one or more brake pads and a second pad clip is placed on the opposing side (e.g., trailing end) of the one or more brake pads. The brake assembly may include more than two pad clips (e.g., one pad clip for each end of each brake pad of the brake assembly). The brake assembly may include three, four, or more discrete pad clips (e.g., one pad clip for each abutment and/or projection of the brake assembly). Preferably, one pad clip is used at each end of the brake pad so that the brake pads are maintained in communication with the support bracket.

Each pad clip may have one or more extensions that function to secure the pad clip to the support bracket, secure other pieces of the brake assembly, or both. The extension may function to assist in securing a pad retraction spring of the present teachings to the pad clip, the support bracket, or both. The extension may be cantilever and extend from a portion of the pad clip. The extension may attach to the support bracket (e.g., at the projection) using any type of securing method. The extension may be free of direct attachment to the support bracket. The extension may be any shape. The extension may be generally planar. The extension may have one or more bends, curves, arcs, and the like over the body of the extension. The extension may have one or more contours, bends, arcs, and the like along one or more edges of the extension. The extension may contact the support bracket at one or more points or lines of contact before, after, or both, a pad retraction spring is installed. The extension may contact at least a portion of the pad retraction spring after the pad retraction spring has been installed. The extension may have one or more cutouts in the body of the extension, along one or more edges of the extension, or both. A cutout in the body may function to provide multiple points of contact (e.g., a ring of contact for a generally ring-shaped cutout) between the extension and the support bracket, a pad retraction spring, or both. A cutout may receive a fastener for attaching the extension to the support bracket, pad retraction spring, or both. For example, a pad clip located at the abutment of the support bracket may include an extension that projects upwardly against a side of a projection of the support bracket. The extension may have one or more curves, with the maximum point of the curve contacting the projection of the support bracket. The extension may include a cutout at the maximum point of the curve to provide a ring of contact with the projection of the support bracket. This may provide additional pressure against the projection. Upon installation of the pad retraction spring, the extension (e.g., at the maximum point of the curve and/or at the cutout) may contact the pad retraction spring at one or more points or lines, apply pressure to the pad retraction spring, hold the pad retraction spring in place, or combination thereof.

One or more of the pad clips may include one or more retraction legs. The retraction legs may function to assist in retracting a brake pad, reduce pad tipping, reduce uneven wearing of the rotor, reduce uneven wearing of friction material of a brake pad, reduce residual drag, reduce rattle noise, or any combination thereof within a brake system. The retraction legs may be any shape, length, thickness, material, and the like to accomplish the desired function. The retraction legs may have one or more curves, bends, angles, contours, linear segments, or any combination thereof. The retraction legs may maintain one or more points or lines of contact with a brake pad. The retraction legs may contact a brake pad above and/or below the longitudinal axis extending through a midpoint of the brake pad. The retraction leg may flex and store energy in one or more locations of the retraction leg due to the force applied from the brake pads being pushed toward the rotor during a brake apply and then release the stored energy and exert a force on the brake pad during a brake release to assist in causing the brake pads to retract and move away from the rotor.

The pad retraction spring of the present teachings functions to assist in retracting the brake pads, reduce pad tipping, reduce uneven wear of the rotor, reduce uneven wear of the friction material, reduce residual (brakes off) drag, reduce rattle noise, or combination thereof within a brake system. The pad retraction spring may be held in place within the brake assembly by the pad clip or may otherwise be secured or attached to the support bracket so that the pad retraction springs will assist the brake pads in retracting after a brake apply. The pad retraction spring may flex and store energy in one or more locations of the pad retraction spring, due to the force applied from the brake pads being pushed toward the rotor during a brake apply, and then release the stored energy and exert a force on the brake pad during a brake release to cause the brake pads to retract and move away from the rotor. During a brake release, the pad retraction spring may assist in forcing the brake pad to retract axially away from the rotor so the friction material is no longer contacting the rotor, an air gap is created between the face of the rotor and the face of the brake pad, or both.

Preferably, the pad retraction spring provides two or more points or lines of contact with a brake pad, which may function to reduce tipping of the brake pad, reduce uneven wearing of the rotor, reduce uneven wear of the friction material, reduce residual brake drag, or a combination thereof within the brake system. Reduction of tipping may be determined by comparing the orientation of the brake pad (e.g., angle of the brake pad in relation to the axis of the rotor) with the orientation of the brake pad of an identical brake assembly under identical conditions without the pad retraction spring of the present teachings. Reduction of uneven wearing of the friction material may be determined by comparing the thickness of friction material between the friction material of the brake pads of the assembly as described herein and the friction material of an identical brake assembly without one or more pad retraction springs. Reduction of uneven wearing of the rotor can be determined by comparing the thickness at various points of a rotor of an assembly as described herein with a rotor of an identical brake assembly without one or more pad retraction springs. Reduction of residual brake drag may be determined by conducting testing to measure and compare the brake drag between the brake assembly as described herein with an identical brake assembly without one or more pad retraction springs. The points or lines of contact between the pad retraction spring and the brake pad may be located at any area of the brake pad. There may be contact above and below a longitudinal axis extending in a central region of the brake pad. As defined by a longitudinal axis extending through a midpoint of the brake pad, there may be one line of contact within a first quarter of the brake pad; one line of contact within a first third of the brake pad; one line of contact within a first half of the brake pad; one line of contact within a bottom quarter of the brake pad; one line of contact within the bottom third of the brake pad; one line of contact within the opposing half of the brake pad; or any combination thereof. For example, a first spring arm may maintain contact with the brake pad above the longitudinal axis (extending in a central region of the brake pad) of the brake pad, and a second spring arm may maintain contact with the brake pad below the longitudinal axis of the brake pad. The lines of contact between the pad retraction spring and the brake pad are preferably at the friction material side of the brake pad to exert a force that forces the friction material away from the rotor. The lines of contact between the brake pad and pad retraction spring are more preferably located at the exposed portion of the pressure plate on the friction material side (e.g., on a brake pad where the friction material does not extend along the entire face of the pressure plate). It is possible that a portion of the pad retraction spring may be generally located at the pressure plate side of the brake pad (e.g., the connection plate located on the pressure plate side of the projection of the support bracket), and a portion of the retraction spring may be generally located at the friction material side of the brake pad (e.g., at least a portion of the spring arms contacting the brake pad on the friction material side).

The pad retraction spring may include a connection plate that functions to connect the pad retraction spring in the brake system. The connection plate may function to support one or more cantilever spring arms. The connection plate may hold the pad retraction spring in place (e.g., prevent rotation and/or tipping of the spring) so that one or more spring arms that extend from the connection plate (e.g., by cantilever connection) may contact the brake pad at one or more points or lines of contact to provide a force that causes the brake pads to retract. The connection plate may generally abut or attach to a portion of the support bracket. The connection plate may have a first end and a generally opposing second end. The connection plate may have one or more additional opposing edges, depending upon the shape of the connection plate. The connection plate may be generally planar. The connection plate may have one or more bends, curves, contours, or the like, at one or more edges of the connection plate, over the body of the connection plate, or both. The connection plate may be any shape that can at least partially be located at a portion of the support bracket. For example, the connection plate may generally match the shape of a portion of the support bracket the connection plate is to be secured or attached to. The connection plate may be smaller, larger, or generally the same size as the portion of the support bracket the connection plate is to be secured to. In a preferred embodiment, the connection plate is located at a side of a projection of the support bracket. In a more preferred embodiment, the connection plate, when installed, is located on the pressure plate side of the projection of the support bracket. During a brake apply, the connection plate is moved into contact or held in contact with the projection so the pad retraction spring is axially prevented from moving.

The connection plate may be attached to the projection by any method that holds the connection plate in a desired location. The connection plate may be held in place by a pad clip instead of or in addition to performing another attachment operation. The connection plate may be attached to the projection, to the pad clip, or both, using an adhesive, a fastener (e.g., a rivet, screw, bolt, or a combination thereof), by employing an attachment operation such as welding or peening, or combination thereof. The extension of a pad clip may extend to cover at least a portion of the projection of the support bracket. The extension may hold the connection plate between the extension and the side of the projection of the support bracket. The connection plate may have a shape that prevents the connection plate from sliding out from between the extension and the side of the projection and/or from rotating in the brake assembly. The connection plate may have a curve, bend, angle, or the like at or near the first end, second end, or any location on the connection plate, to assist in maintaining the position of the connection plate within the brake assembly. For example, the connection plate may have a curve at the first end (e.g., an end that is not connected to one or more spring arms) that extends away from the projection so that the curved portion may contact an edge of the extension (e.g., during braking conditions, non-braking conditions, or both) and prevent the connection plate from sliding.

The pad retraction spring may include one or more spring arms that function to provide an axial force on a brake pad, assist in retracting a brake pad away from a rotor, reduce or prevent rotation of the brake pad along a longitudinal axis extending through a central region or midpoint of the brake pad (i.e., pad tipping), reduce uneven wear of the rotor, reduce uneven wear of friction material, reduce residual brake drag, or a combination thereof. The spring arms may be of any shape, size, width, thickness, and the like, so that the retraction spring arms assist in retracting the brake pads. One or more spring arms may be employed in the pad retraction spring. One or more spring arms may be connected to and extend from a portion of the connection plate. One or more spring arms may include a portion that extends back toward the connection plate, which may allow the spring arms to provide an axial force in relation to the rotor axis toward the connection plate during a brake apply. The connection plate and at least, a portion of one or more spring arms may be located on opposite sides of a brake pad. For example, the connection plate may be secured to the pressure plate side of the projection of the support bracket, which is at the side of the pressure plate opposite the friction material side of the brake pad, while at least a portion of the one or more spring arms is in contact with the friction material side of the brake pad.

The spring arms may include one or more segments joined by a biasing portion. These segments may form an angle at the biasing portion. The angle may change throughout the course of a brake apply and retract. For example, during a brake apply, the spring arms may flex and store energy when the brake pad is pushed toward the rotor, causing the angle to become larger. During a brake apply or a brake release, the spring arms may provide an axial force (e.g., along the rotor axis, along the piston bore axis, or both) on the brake pad, which may cause the angle to become smaller as the spring arms cause or assist in causing the brake pad to retract. The segments of a spring arm may include, but are not limited to, a projection portion and a brake pad portion joined by the biasing portion. The projection portion and the brake pad portion may have a width, a length, and a thickness. The dimensions of the projection portion, brake pad portion, and biasing portion may be dependent upon the amount of force applied during a brake apply and retract; the amount of energy to be stored at particular locations along the spring arm during a brake apply; the amount of force the pad retraction spring will exert on a brake pad during a brake pad retract; the amount of elastic deformation, plastic deformation, or both, desired; or any combination thereof. The dimensions (e.g., width, thickness, or both) may be generally constant throughout the entire spring arm. The projection portion may have a width that is generally the same as the brake pad portion. The projection portion may have a width that is greater than or less than the width of the brake pad portion. For example, to control the amount of force exerted on the brake pad, the width of the brake pad portion (and therefore the line of contact with the brake pad) may be less than the width of the projection portion.

A projection portion may function to connect the connection plate and the spring arm, hold the spring arm in proper position within the brake assembly, reduce rotation of the pad retraction spring, provide an area for, spring arms to contact each other, or any combination thereof. The projection portion may function to extend from a first side of the brake pad to a second side of the brake pad. The projection portion may project the spring arm across the front face of the projection of the support bracket. The projection portion may project at least a portion of the spring arm to the opposing side of the brake pad. For example, the projection portion may extend through a cutout or a contour of the brake pad so the projection portion can fit between the brake pad and the support bracket. The projection portion may include one or more segments. The projection portion may include, but is not limited to, a connection segment, an angled segment, a contact segment, a directing segment, or any combination thereof. The projection portion may include one or more guide projections that extend from an edge of the projection portion toward the front face of the projection.

The one or more guide projections may function to hold the projection portion of the spring arm in place, reduce rotation of the pad retraction spring within the brake assembly, store energy when the pad retraction spring is pushed toward the projection, or combination thereof. The one or more guide projections may contact the projection of the support bracket (e.g., at the front face of the projection) during a running condition, a brake apply, a brake release, or any combination thereof. The guide projection may be any shape. The guide projection may be generally planar. The guide projection may have one or more bends, curves, contours, angles, and the like, in the body of the guide projection, at the edges of the guide projection, or both. The guide projection may maintain a point or line of contact with the projection of the support bracket during a brake apply, a brake release, or both.

The connection segment may function to connect the spring arm to and extend from the connection plate (e.g., at the second end of the connection plate). The connection segment may function to store energy during a brake apply (e.g., where the connection segment and the connection plate are joined, where the connection segment joins to another segment of the pad retraction spring, or both). The connection segment may extend from the second end of the connection plate at an angle. The angular relationship between the connection segment and the connection plate may depend on the shape of the projection of the support bracket. For example, a connection plate located at the pressure plate side of the projection may require the connection segment to extend from the second end of the connection plate at an angle that generally allows at least the connection segment of the projection portion to be located along the front face of the projection. The angle measured between the connection plate and the connection segment may be about 180° or less, about 150° or less, about 120° or less, or about 100° or less. The angle measured between the connection plate and the connection segment may be about 25° or more, about 45° or more, about 60° or more, or about 80° or more. The retraction spring may include a connection segment for each spring arm. The retraction spring may include a single connection segment for two or more spring arms. For example, a single connection segment may extend from the connection plate, and two or more spring arms may extend from the connection segment. In a preferred embodiment, the connection segment of a first spring arm is generally planar and may be separated from another spring arm by a distance. The connection segment of the first spring arm may be generally parallel to a connection segment of another spring arm during a resting condition (e.g., non-brake apply conditions). During a brake apply, the connection segment may store energy (e.g., where the connection segment joins to the connection plate, another segment of the pad retraction spring, or both), and the distance may become smaller. During the brake apply, the connection segments may be forced toward each other, the connection segments may elastically deform, the connection segments may be in a non-parallel orientation with each other, or combination thereof. During a brake release, the stored energy may force the connection segments to return generally to a resting position.

The connection segment may be connected to an angled segment. The connection segment may function to connect the connection segment with other segments of the pad retraction spring. The angled segment may function to store energy during a brake apply, elastically deform, or both. The angled segment may function to guide the spring arms of the pad retraction spring toward each other so that the spring arms may contact each other during a brake apply. The angled segment may function to direct the projection portion away from another spring arm. The angled segment may reduce or increase the distance between the two or more spring arms. For example, the angled segment of one spring arm (e.g., the first spring arm) may be angled toward a portion of another spring arm (e.g., the second spring arm). The angled segment of the second spring arm may be angled toward the first spring arm. During a brake apply, the angled segments may be forced toward each other. The area where the connection segment and the angled segment join may store energy, elastically deform, or both. During a non-braking condition (e.g., brake release), the stored energy may force the angled segments to generally return to a resting position. The angled segment of each spring arm may direct the spring arms away from each other in opposing directions. The spring arm may include a directing segment that further directs the spring arms in opposing directions (e.g., one directing segment is directed above a longitudinal axis of the brake pad and the other directing segment is directed below the longitudinal axis of the brake pad.

Each spring arm may include a contact segment connected to the angled segment. The contact segment may function to contact another contact segment, such as during a brake apply. The contact segment may function to store energy. A contact segment may prevent an opposing contact segment from further movement, prevent further elastic deformation of the projection portion of the spring arm, or both. The contact segment may be generally planar. The contact segment may have one or more bends, curves, arcs, angles, or the like, on the body portion of the contact segment, at the edges of the contact segment, or both. The contact segment may be generally parallel to the connection segment. In a resting position, it is possible that the contact segments may not contact each other, and a distance may located between the contact segment of the first spring arm and the contact segment of the second spring arm. This distance may be smaller than the distance between the connection segment of the first spring arm and the connection segment of the second spring arm. In the event of a brake apply, the force from the brake pad being pushed toward the rotor may cause the first spring arm and the second spring arm to contact each other at the contact segments connected to the angled segments. The contact segments of each spring arm may be generally parallel so that when a force is applied to the spring arm, the contact segments contact each other over a portion or all of the contact segment.

The contact segment, or another portion of the projection portion of the spring arm may be connected to the biasing portion of the pad retraction spring. The biasing portion of the spring arm functions to store energy. The biasing portion functions to elastically deform, plastically deform, or both. The biasing portion functions to connect the projection portion and the brake pad portion of the retraction spring. The biasing portion allows the spring arm to store energy during a brake apply, when the brake pad and spring arms are moved toward a rotor, and assists in the retraction of the brake pad during a brake release. The biasing portion may connect the contact segment and the body segment of the retraction spring, forming an angle. During a brake apply, the brake pad and at least a portion of the spring arms are moved toward the rotor, and the angle between the contact segment and the body segment increases and stores energy. In another embodiment, where the spring arms do not contact each other, the angle between the directing segment and the body segment increases and stores energy.

During a brake release, the spring arms exert a force on the brake pad to retract the brake pad so the brake pads move in an axial direction away from the rotor and/or toward the connection plate. The angle of the biasing portion is then reduced. The angles may return to the starting position or the resting position of the retraction spring prior to the brake apply. The angles may return to substantially similar angles between the contact segment and the body segment as prior to the brake apply (e.g., within about 0.5 degrees or more, within about 3 degrees or more, or within about 5 degrees or more; within about 20 degrees or less, within about 15 degrees or less, or within about 10 degrees or less). The starting position prior to the brake apply may change throughout the life of the brake assembly. As the friction material wears, the angle of the biasing portion may increase. For example, the angle of the biasing portion may increase to the point where plastic deformation occurs, thereby establishing a new starting position prior to the next brake application. In a resting or starting position, the angle of the biasing segment may be about 30° to about 40°. The resting position of the angle may change throughout the lifetime of the retraction spring. The angle of the biasing segment, during a brake apply, may increase to about 35° or more, about 45° or more, about 60° or more, or even about 90° or more during a brake apply, particularly as the friction material of the brake pad wears.

The pad retraction spring may include a brake pad portion that may function to contact the brake pad. The brake pad portion may be at least partially located on the side of the brake pad opposite the connection plate. At least a portion of the brake pad portion may extend from the biasing portion back toward the connection plate. The brake pad portion may include one or more segments. The segments may include, but are not limited to, a body segment, a transition segment, a curved segment, or any combination thereof.

The body segment may function to provide support to the pad retraction spring; locate the line of contact at a desired location on a brake pad; or combination thereof. The body segment may be sufficiently long to allow the retraction spring to contact the brake pad in a desired location on the brake pad, provide additional strength and/or stiffness to the retraction spring, or both. The body portion may be a generally planar segment or may have one or more bends, curves, arcs, angles, the like, or any combination thereof. The body segment may generally extend back in a direction toward the connection plate (e.g., at an angle that generally increasingly extends toward the connection plate). The body segment may be any length that allows the pad retraction spring to maintain contact with the brake pad and provide a force to retract the brake pad. The body segments of each spring arm may be generally of an equal length. For example, a pad retraction spring having a first spring arm and a second spring arm may have body segments that are generally the same length. The body segments of each spring arm may be generally different lengths. For example, with a pad retraction spring having a first spring arm and a second spring arm, the first spring arm may have a body segment that is shorter or longer than the body segment of the second spring arm. A brake assembly including two or more pad retraction springs may have body segments of similar lengths. For example, each first spring arm of each pad retraction spring may have substantially similar or the same lengths. Each second spring arm of each pad retraction spring may have substantially similar or the same lengths. The lengths of the body segment may be dependent upon on the amount of force needed for the spring arm to exert on the brake pad, the shape of the brake pad, the location of the pad retraction spring in relation to the longitudinal axis of the brake pad running through a central region, such as a midpoint, the location of the desired line of contact between the spring arm and the brake pad, or any combination thereof.

The body segment may connect to a transition segment. The transition segment may function to provide a smooth transition to a curved segment connected to the opposing end of the transition segment. The transition segment may store energy upon a brake apply as the brake pads are forced toward the rotor of the brake assembly. The transition segment may assist in providing an axial force upon the brake pad toward the connection plate upon a brake release. The transition segment may be a generally smooth curve. The transition segment may form an angle between the body segment and the portion of the curved segment connected to the transition segment. The angle may be about 180° or less, about 150° or less, about 120° or less, or about 90° or less. The angle may be about 5° or more, about 25° or more, about 50° or more, or about 75° or more.

The curved segment may function to provide a point or line of contact with the brake pad. The curved segment is preferably curved inwardly toward the brake pad to contact the brake pad and maintain contact with the brake pad during a brake apply and a brake release. As the friction material of the brake pad wears away over time due to the usage of the brake assembly (i.e., the thickness of the friction material is reduced), to continue to slow or stop a vehicle, the brake pad will be pushed further to achieve contact with the rotor than when the friction material was thicker. The body segments may be forced to extend to or past a vertical center plane (e.g., the angle at the biasing portion is greater than about 90°). The curved segment that contacts the brake pad may allow the spring arms to maintain, contact with the brake pad. The curved segment may be any shape that allows the spring to maintain contact with the brake pad. The curved segment may be substantially symmetrical, asymmetrical, bell curve shaped, tear drop shaped, may have a steep slope on one end and a gradual slope on the opposing end, one or more contours, one or more angles and/or corners, or a combination thereof. The maximum height of the curved segment (e.g., the area that forms the line of contact with the brake pad) may be located at any point along the curved segment. The maximum height may be located in the center of the curve (e.g., as measured from the center point of the length of the curved segment). The length of the curved segment may be any length that allows the curved portion to maintain a line of contact with the brake pad. The length of the curved segment may be measured along a plane extending from the tangent of the curve of the transition segment to the terminating tip of the spring arm. The length of the curved segment may be about 0.1 mm or more, about 1 mm or more, or about 2 mm or more. The length of the curved segment may be about 10 mm or less, about 6 mm or less, or about 4 mm or less. The curved segment may have a length to height ratio of about 1:1 or more, about 2:1 or more, or about 5:1 or more. The curved segment may have a length to height, ratio of about 10:1 or less, about 8:1 or less, or about 6:1 or less.

The pad retraction spring may be any configuration that exerts a force to cause a brake pad to retract (e.g., an axial force toward the connection plate of the pad retraction spring). The size and dimensions of the pad retraction spring may vary depending on the application and the size of the brake assembly into which the retraction springs may be installed. For example, the length of the spring arms, width of the spring arms, thickness of the spring arms, number of segments, angles between segments, shape and curve of the curved segment, or any combination thereof, can be altered depending on the application (e.g., force to be exerted, energy to be stored, dimensions of the assembly, and the like). It may be desirable that the retraction spring is non-handed so that the retraction spring can be used with either an inboard or an outboard brake pad. It may be desirable to have a generally symmetric retraction spring relative to a horizontal median plane. In certain applications, it may be desired to have differing spring arm lengths on the same retraction spring. For example, a spring arm that contacts the brake pad above the longitudinal axis of the brake pad may require a longer or a shorter spring arm than the spring arm that contacts the brake pad below the longitudinal axis of the brake pad to distribute the load on the pressure plate at particular locations.

The retraction spring arms may exert a force axially, in relationship to the rotor, in the retract direction. The retraction spring arms may apply any amount of force that assists the brake pads in moving axially, relative to the rotor, after a brake apply. Each retraction spring arm may assert a different force on the brake pad. For example, the force exerted by each spring arm may depend on the location of the line of contact with the brake pads. The retraction spring arms may exert substantially the same force at each line of contact with the brake pads. The retraction spring may serve as a supplemental retraction device working in conjunction with one or more additional retraction devices (e.g., a pad clip having one or more retraction legs, retraction springs, or both). The retraction spring arms, additional retraction devices (e.g., a pad clip having one or more retraction legs, retraction springs, or both), or both, may each exert an axial force in the retract direction of about 5 N or more, about 10 N or more, about 15 N or more, or about 20 N or more. The one or more arms, additional retraction devices (e.g., a pad clip having one or more retraction legs, retraction springs, or both), or both, may each exert an axial force in the retract direction of about 45 N or less, about 40 N or less, or about 35 N or less. Preferably, each retraction spring arm, additional retraction device (e.g., a pad clip having one or more retraction legs, retraction springs, or both), or both, will exert a force of between about 5 N to about 25 N. Two spring arms may be used per brake pad (i.e. one with a line of contact above and one with a line of contact below the longitudinal axis extending through a midpoint of the brake pad). Additional retraction devices may also be used on each brake pad. Both spring arms, additional retraction devices, or both, may exert an axial force in the retract direction on one brake pad. For example, one retraction spring arm may exert a force of about 20 N and two retraction spring arms may exert a force of about 40 N on each brake pad. Additional retraction devices (e.g., a pad clip having one or more retraction legs, retraction springs, or both), may exert additional force on each brake pad. Two retraction spring arms may exert a force of about 10 N or more, about 20 N or more, about 30 N or more, about 40 N or more, about 50 N or more, or even about 60 N or more. Two retraction spring arms may exert a force of about 100 N or less, about 90 N or less, about 80 N or less, or about 70 N or less. Preferably, the brake may include an inboard brake pad and an outboard brake pad and the spring arms may apply substantially the same amount of force to both brake pads in the retract direction.

The pad retraction spring may be made of any material that may be formed and may exert a force when compressed. The pad retraction spring may be made of and/or include polymeric materials. The pad retraction spring may be made of plastic. The pad retraction spring may be made of multiple materials. The pad retraction spring may be made of different materials. For example, a portion of the pad retraction spring may be metal and a portion of the pad retraction spring may be a polymeric material such as rubber. Preferably, the pad retraction spring may be made of the same material. More preferably, the pad retraction spring may be made of metal. The pad retraction spring may be any metal that exhibits good plastic deformation and good elastic deformation characteristics. More preferably, the pad retraction spring may be made of stainless steel. The pad retraction spring may be made of a wire, a sheet, a band, tube, pipe, or the like. Preferably, the pad retraction spring is made of a sheet of metal. The pad retraction spring may be formed from one unitary piece of sheet metal so that the pad retraction spring is one unitary piece. More preferably, the pad retraction spring is made of a stamped and formed sheet of metal. Most preferably, the pad claim may be made of 301 ¾ hard stainless steel measured using ASTM A666. The material may be any gauge (i.e. thickness) so that retraction spring arms assist in moving the brake pads in the retract direction. The material may be any size that allows the pad retraction spring to exert a desired force. The material may be any size (e.g., thickness, diameter, gauge, length, width, or the like) that allows the pad retraction spring to assist in pad retraction. The sheet may be may be about 0 gauge or larger, about 3 gauge or larger, about 5 gauge or larger, or about 10 gauge or larger. The sheet may be about 30 gauge or smaller, about 25 gauge or smaller, or about 20 gauge or smaller (e.g., between about 22 gauge and about 12 gauge (i.e., about 18 gauge when measured using the steel gauge scale)). The thickness of the material may vary across the pad retraction spring. Preferably, the thickness of the material is substantially uniform across the entire pad retraction spring.

The pad retraction spring arms may deform as the brake pads wear. The deformation may be elastic deformation. For example, the shape of the retraction spring arms do not permanently change as the brake pads wear, but the retraction spring arms elastically deform so that the spring arms remain between the two brake pads, and assist in returning the brake pad substantially back to its pre-brake position so that a constant air gap is maintained. Air gap may be the total distance between the face of the inboard brake pad and the face of the outboard brake pad minus the thickness of the rotor, when the inboard brake pad contacts the piston and the outboard brake pad contacts the fingers. To state it another way, air gap may be the distance between the face of the rotor on the outboard side and the face of the outboard brake pad when the inboard brake pad is pushed into contact with the face of the rotor on the inboard side and when the inboard brake pad contacts the piston and the outboard brake pad contacts the fingers. The air gap may be any size that allows for braking. The air gap may be of any size that does not cause the brake pedal to have a soft feel or a long travel. Preferably, the air gap will be small (e.g. between about 0.05 mm to about 0.2 mm). The deformation may be plastic deformation. For example, as the brake pads wear the spring arms will change shape so that the angles between the segments of the spring arm change and establish a new starting position prior to the next brake apply. The amount of deformation may vary from as the brake pad wears. For example, the retraction spring arms will be substantially free of deformation when the brake pads are new and will be at their maximum deformation when the brake pads are fully worn so that the amount of force applied to the brake pad is maintained substantially constant. In another example, as the retraction spring arms plastically deform, the force exerted against each brake pad will remain substantially constant.

Figure 1:
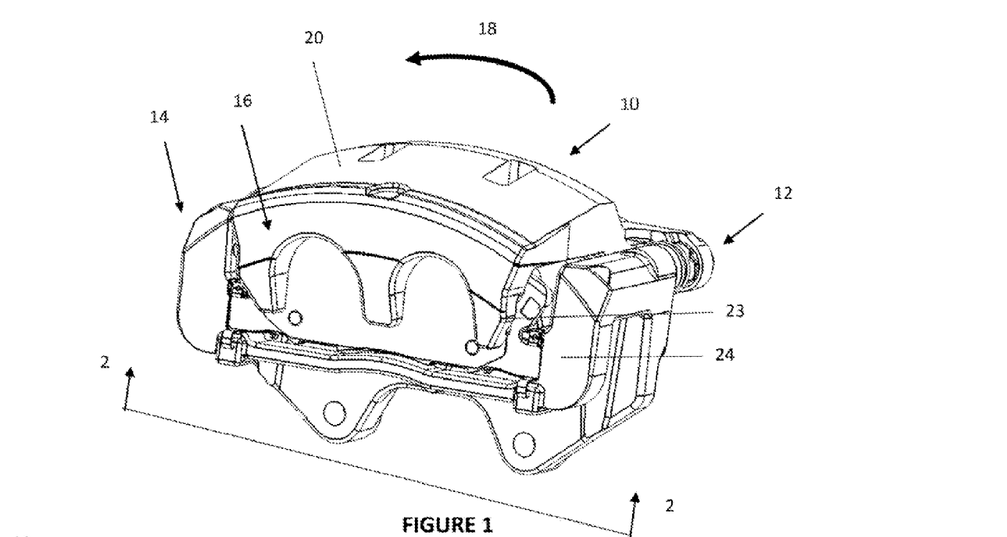
FIG. 1 illustrates a perspective view of a brake assembly.

FIG. 1 illustrates a perspective view of a brake assembly 10 having a leading end 12 and a trailing end 14. The brake assembly includes a caliper 16 and a rotor (not shown) that rotates in direction 18. The brake assembly includes a bridge 20 that extends between and connects one or more piston bores that house pistons 22 (see FIG. 2) to one or more fingers 23. The brake assembly 10 also includes a support bracket 24 in communication with the caliper 16.

Figure 2:
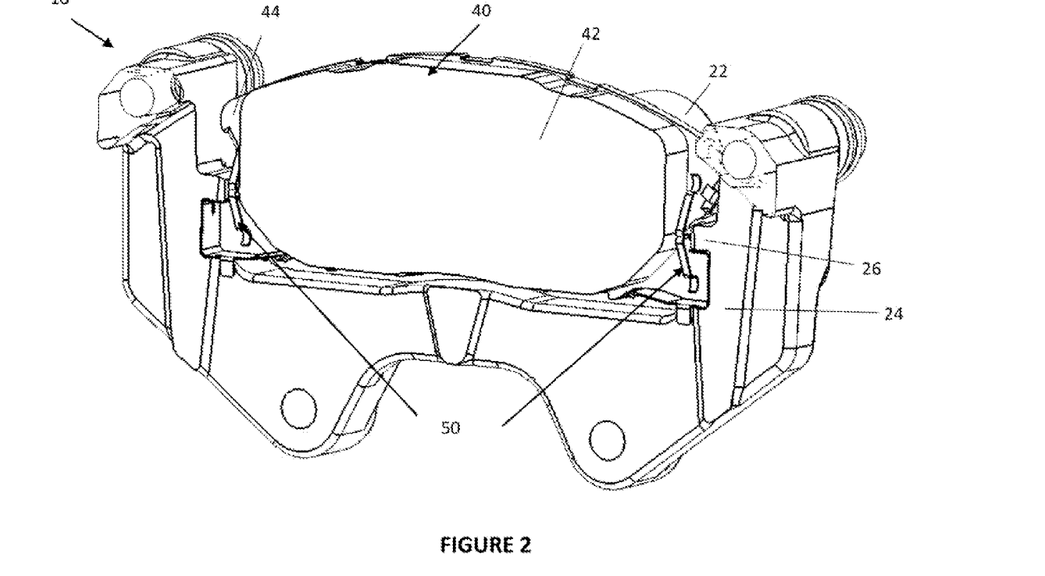
FIG. 2 illustrates a view of FIG. 1 cut at line 2-2 with the caliper removed to show a pad retraction spring in the brake assembly.

FIG. 2 illustrates a cross-sectional view of the brake assembly 10 of FIG. 1 cut along lines 2-2 with the caliper removed. The support bracket 24 has one or more projections 26, which assist in supporting a brake pad 40. The brake pad 40 includes friction material 42 on one side of a pressure plate 44. Two retraction springs 50 are located on each end of the brake pad 40 to assist in retracting the brake pad 40.

Figure 3:
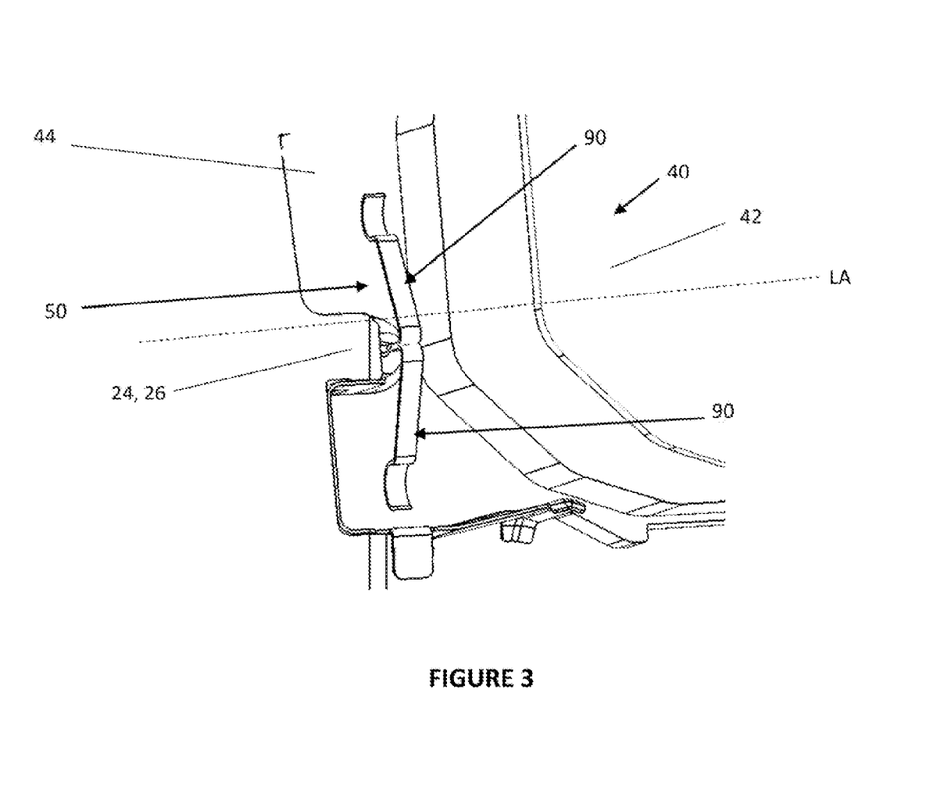
FIG. 3 illustrates a close-up view of a pad retraction spring and a brake pad.

FIG. 3 illustrates a close-up view of a portion of a retraction spring 50 installed within a brake assembly. The brake pad 40 includes a pressure plate 44 carrying friction material 42, and the friction material 42 contacts a rotor (not shown) upon a brake apply. The retraction spring 50 includes two brake pad portions 90 that contact the pressure plate 44 of the brake pad 40. One brake pad portion 90 contacts the pressure plate 44 above a longitudinal axis (LA) of the brake pad 40, and one brake pad portion 90 contacts the pressure plate 44 below the longitudinal axis (LA) of the brake pad 40. The longitudinal axis (LA) extends through a midpoint of the brake pad 40. The retraction spring 50 also includes a portion that is secured to the pressure plate side 32 (see FIG. 4) of the projection 26 of the support bracket 24 and a portion that extends across the front face 30 (see FIG. 4) of the projection 26 so that each brake pad portion 90 can contact the pressure plate 44 of the brake pad 40 on the opposing side of the brake pad.

Figure 4:
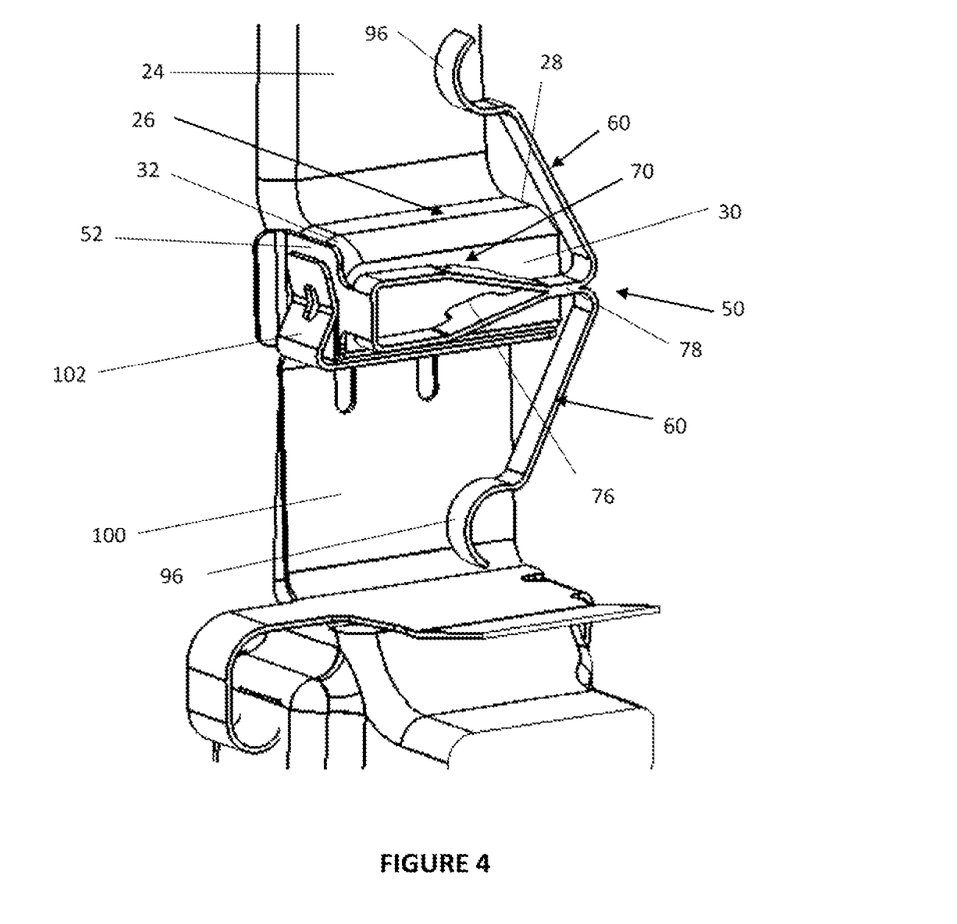
FIG. 4 illustrates a partial perspective view of the pad retraction spring installed on a support bracket.

FIG. 4 illustrates the retraction spring 50 installed at the projection 26 of the support bracket 24. The projection 26 has a friction material side 28 and a pressure plate side 32, which are joined at a front face 30. The retraction spring 50 includes a connection plate 52 held against the pressure plate side 32 of the projection 26. In this illustration, a brake pad clip 100 installed on the support bracket 24 including an extension 102 assisting in holding the retraction spring 50 in place. The retraction spring 50 includes two spring arms 60 that include a projection portion 70 that extends from the connection plate 52 across the front face 30 of the projection 26 and a brake pad portion 90 that extends back toward the connection plate 52. A guide projection 76 may contact the front face 30 and assist in holding the retraction spring 50 in proper position and/or prevent rotation of the spring. The opposing spring arms 60 may contact each other at a contact segment 78 of the projection portion 70, such as during a brake apply and the early stages of brake release as the spring works to retract the brake pad. The brake pad portions 90 of the spring arms 60 contact the brake pad (not shown) at a line of contact at curved segments 96.

Figure 5:
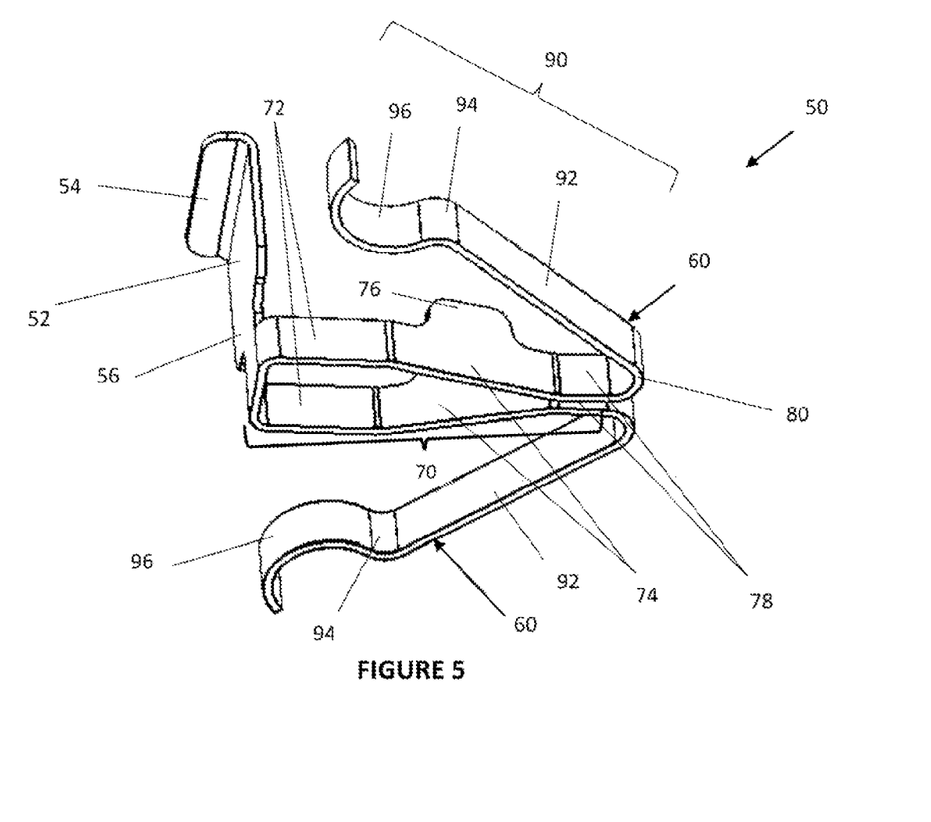
FIG. 5 illustrates a top perspective view of a pad retraction spring.

FIG. 5 illustrates a retraction spring 50. The retraction spring 50 includes a connection plate 52 that abuts against or is secured to a pressure plate side 32 of the projection 26 of the support bracket (see FIG. 4). The connection plate 52 has a first end 54 and a second end 56. The first end 54 may be shaped (e.g., having a generally rounded portion) or in an angular relationship with the portion of the connection plate 52 abutting against the projection 26 of the support bracket 24. The shaped first end 54 may assist in reducing rotation of the retraction spring 50 during a brake apply and a brake release and may prevent the retraction spring 50 from sliding away from the brake pad clip 100 (see FIG. 4). Two spring arms 60 extend from the second end 56 of the connection plate 52 at an angle so that the spring arms 60 can extend across the front face 30 of the projection 26 (see FIG. 4). The spring arms 60 also have a portion that extends back toward the connection plate 52. In this illustration, each spring arm includes a projection portion 70 extending from the second end 56 of the connection plate 52 and a brake pad portion 90, which are joined at a biasing portion 80. The projection portion 70 includes a connection segment 72 that connects the spring arm 60 to the second end 56 of the connection plate. The opposing side of the connection segment 72 connects to an angled segment 74, which connects to a contact segment 78. During a brake apply, the contact segment 78 of each spring arm 60 is forced into contact with the other. The biasing portion 80 joins the contact segment 78 to the brake pad portion 90 at a body segment 92. The biasing portion allows the spring arm to store energy during a brake apply when the brake pad and spring arms are moved toward a rotor and assists in the retraction of the brake pad during a brake release. The body segment 92 of the brake pad portion 90 connects to a transition segment 94, which provides a transition into a curved segment 96 where the spring arm 60 terminates.

Figure 6:
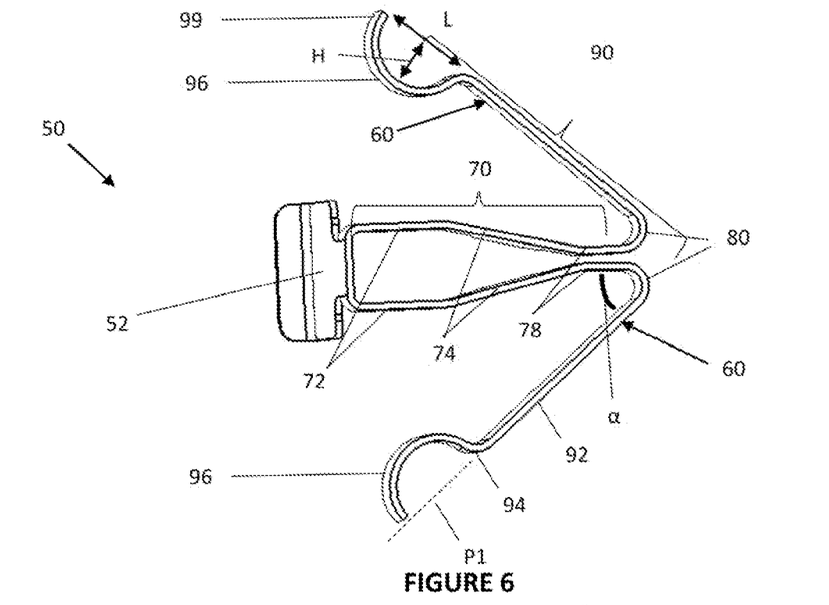
FIG. 6 illustrates a front view of a pad retraction spring in the brake pad retract position.

FIG. 6 illustrates a retraction spring 50 at rest (i.e., after and/or before the brakes are applied). The retraction spring 50 includes a connection plate 52 which abuts against the projection 26 of the support bracket 24 when installed (see FIG. 4). The connection bracket 52 is connected to the projection portion 70 at the connection segment 72. The opposing end of the connection segment 72 connects to the angled segment 74 which connects to the contact segment 78. In this illustration, the connection segments 72 of each spring arm 60 are generally parallel to each other. The angled segments 74 of each spring arm 60 are generally angled toward each other so the contact segments 78 can contact each other upon a brake apply. When this retraction spring 50 is at rest, the contact segments 78 are generally separated by a distance and are generally parallel to each other. The contact segments 78 are connected to the biasing portion 80, which connects the projection portion 70 and the brake pad portion 90 of each spring arm 60. The biasing portion 80 includes an angle ($\alpha$), which is generally formed between the contact segment 78 and the body segment 92 of the spring arm 60. This angle ($\alpha$) may change depending on the condition (e.g., brake apply or brake release) or depending on the amount of wear of the friction material 42 (see FIG. 2). In this illustration, the body segment 92 is generally planar and is joined to the curved segment 96 by the transition segment 94. The curved segment 96 has a generally arcuate shape, with the arc having a length (L) measured from the tangent of the curve of the transition segment 94 to the terminating tip 99 of the spring arm 60. The arc of the curved segment 96 also has a height (H) measured from the highest point of the curve to a point immediately below on a plane (P1) extending between the curve of the transition segment 94 to the terminating tip 99 of the spring arm 60.

Figure 7:
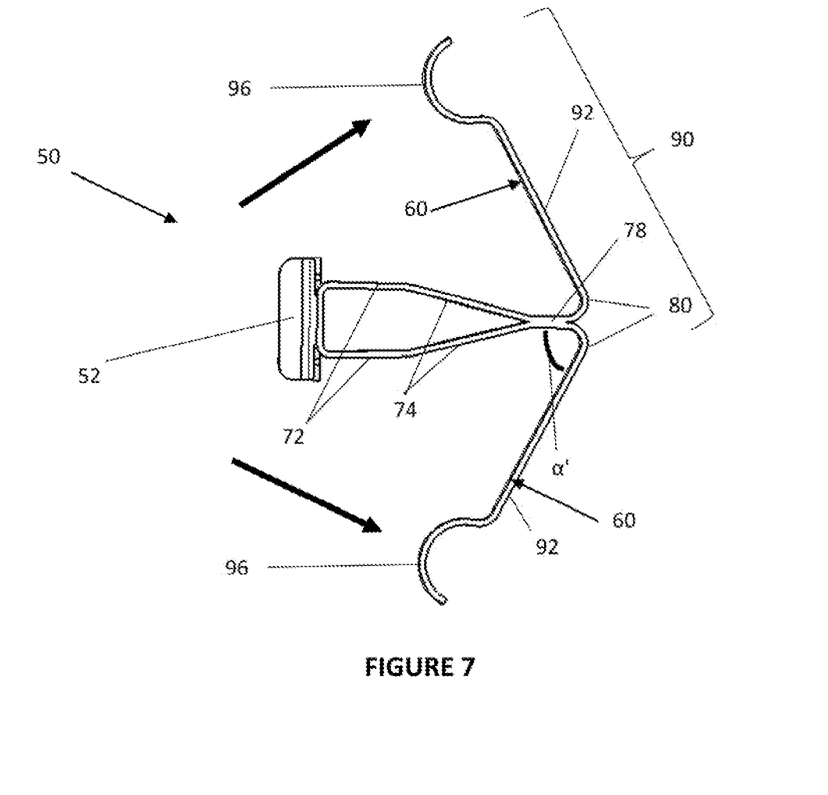
FIG. 7 illustrates a front view of a pad retraction spring in the brake apply position.
Figure 8:
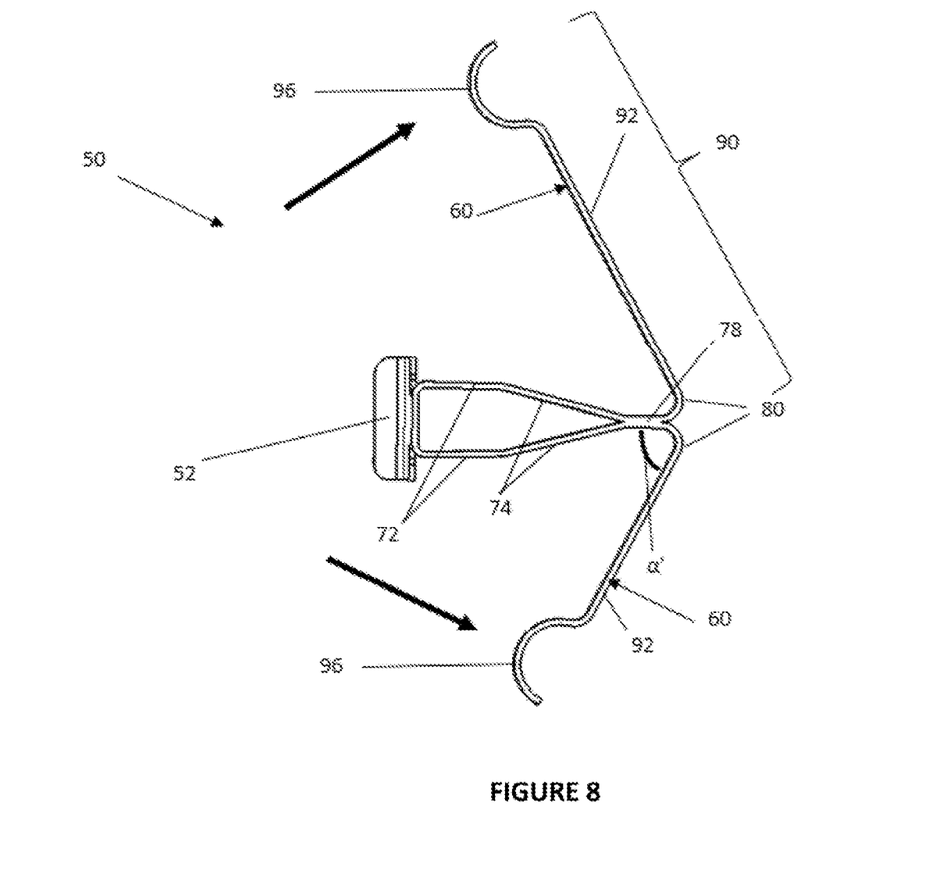
FIG. 8 illustrates a front view of a pad retraction spring having spring arms of unequal lengths.

FIGS. 7 and 8 illustrate a retraction spring 50 during a brake apply, during brake wear, or both. During such conditions, the contact segments 78 of each spring arm 60 are forced into contact with each other, and the brake pad portion 90 is forced away from the connection plate 52 (as shown by the arrows in the figure), with the curved portions 96 maintaining contact with the brake pad (not shown) as it moves toward the rotor of the brake assembly. The angle ($\alpha'$) of the biasing portion 80 generally formed between the contact segment 78 and the body segment 92 of each spring arm 60 is greater than the angle (α) of FIG. 6. Upon a brake release, the spring arms exert a force on the brake pad to cause the brake pad to retract away from the rotor and the retraction spring 50 returns generally to the shape of FIG. 6. FIG. 8 also illustrates a retraction spring 50 having two spring arms 60 of differing body segment 92 lengths.

Figure 9:
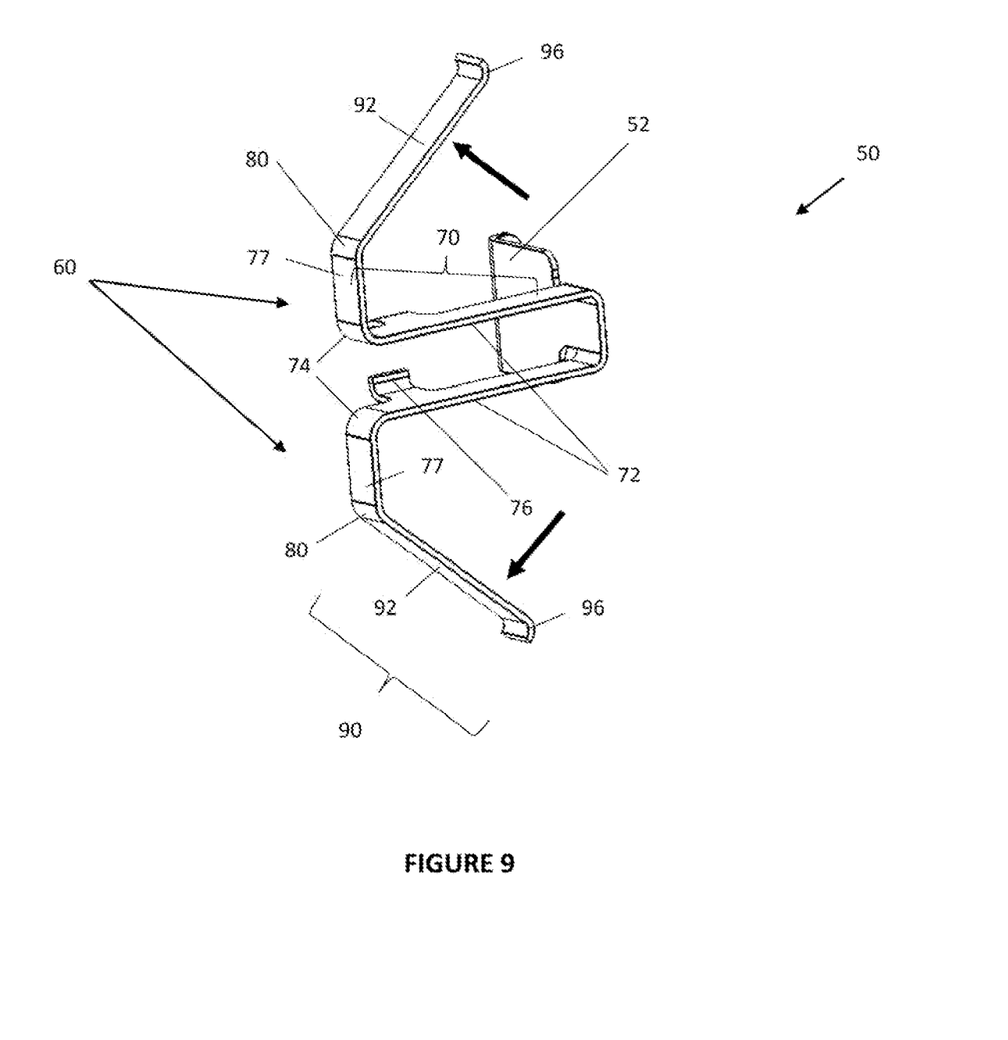
FIG. 9 illustrates a perspective view of a pad retraction spring.

FIG. 9 illustrates a retraction spring 50. The retraction spring 50 includes a connection plate 52 that contacts the pressure plate side 32 of the projection 26 of the support bracket 24 (see FIG. 4). Two spring arms 60 project from the connection plate 52, the spring arms 60 generally having a projection portion 70 connected to the connection plate 52, a biasing portion 80 connected to the projection portion 70, and a brake pad portion 90 connected to the biasing portion. Each projection portion 70 includes a connection segment 72 that connects to the connection plate 52 and extends across the front face 28 of the projection 24. As a brake apply causes the brake pad portion 90 to move in the direction of the arrows, the projection portions 70 of each spring arm 60 may be forced toward each other. The connection segments 72 include a guide projection 76 which contacts the front face 28 and assists in maintaining proper positioning of the retraction spring 50 in the brake assembly. The guide projection 76 may also at least partially resist the forces pushing the projection portions toward each other. The spring arms 60 each include an angled segment 74 that angles the spring arms 60 away from each other in generally opposing directions. The angled segment 74 is connected to a directing segment 77 that continues to direct the spring arms 60 in opposing directions. At a biasing portion 80, a body segment 92 is directed back toward the connection plate 52. A curved segment 96 contacts a brake pad (not shown), and the retraction spring 50 flexes and stores energy upon a brake apply, especially at the biasing portion 80, and then forces the brake pad to retract upon brake release.

Figure 10:
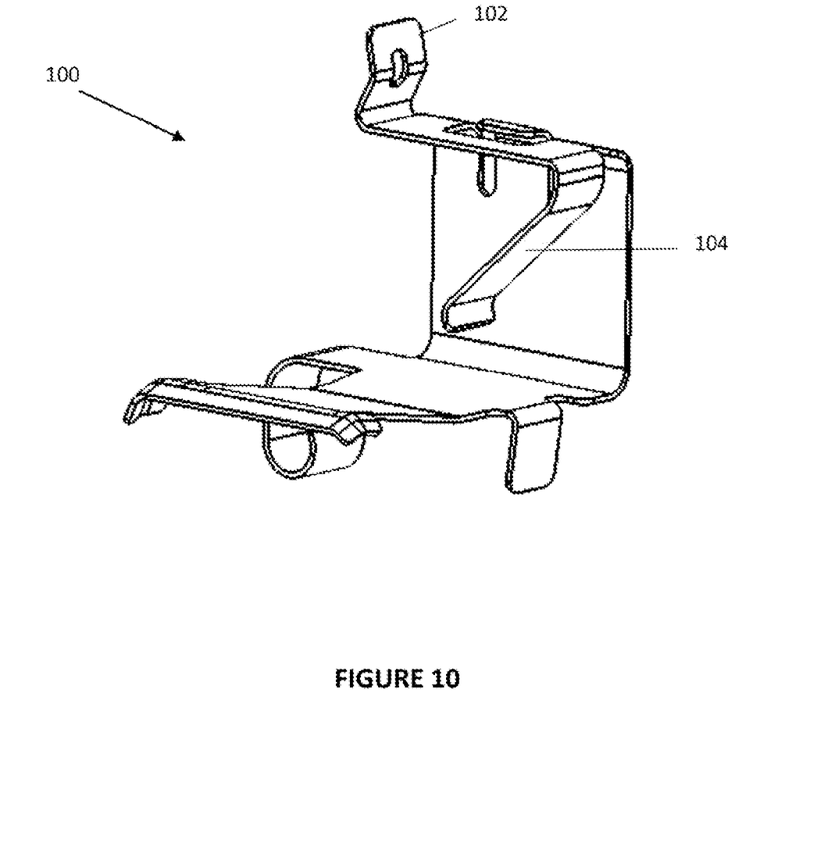
FIG. 10 illustrates a perspective view of a pad clip.
Figure 11:
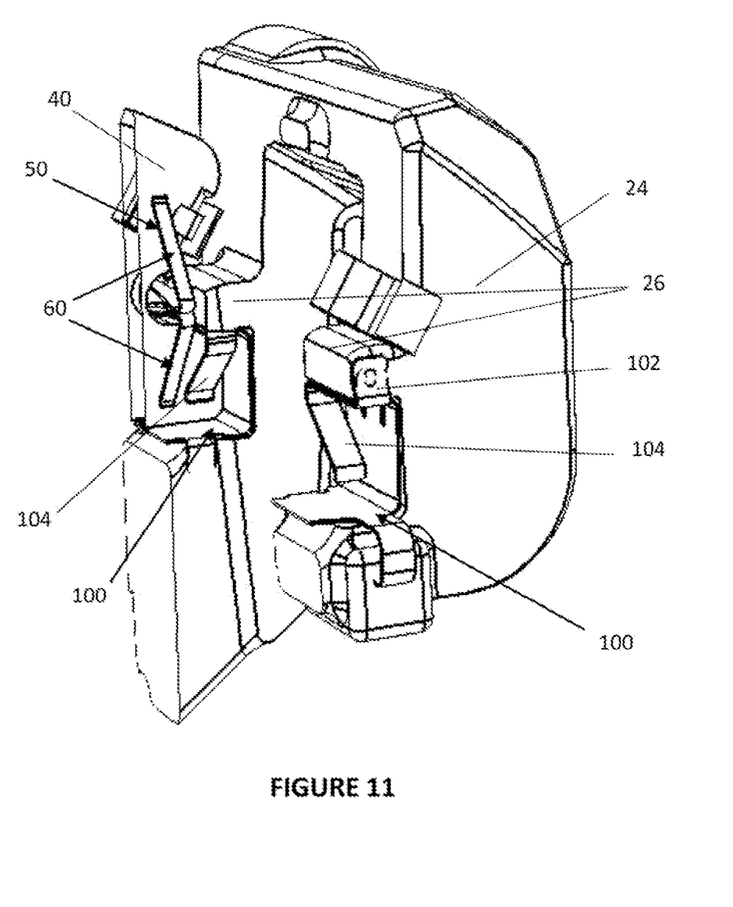
FIG. 11 illustrates a partial cutaway view of the pad clip of FIG. 10 within the brake assembly with the caliper removed.

FIGS. 10 and 11 illustrate a brake pad clip 100. The brake pad clip 100 includes an extension 102 and one or more retraction legs 104. The retraction legs 104 function to assist in retracting a brake pad 40 during a brake release, running conditions, or both. FIG. 11 illustrates a partial view of a support bracket 24 including projections 26. Brake pad clips 100 are located on the support bracket 24, and the brake pad clip 100 includes an extension 102 that extends upwardly toward and/or against the projection 26 to hold a retraction spring 50, brake pad clip 100, or both, in place. The brake assembly also includes a retraction spring 50 that assists in retracting, a brake pad 40 along with the retraction leg 104 of brake pad clip 100. The retraction spring 50 includes spring arms 60 that contact the brake pad 40 at a point or line of contact. The retraction leg 104 also contacts the brake pad 40 at a point or line of contact. A brake pad clip 100 with a retraction leg 104 may be located at any, all, or some ends of the brake pads 40 within the brake assembly. A retraction spring 50 may be located at any, all, or some ends of the brake pads 40 within the brake assembly. A pad retraction spring 50 may be used with any, all, some, or none of the brake pad clips 100 with a retraction leg 104.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the teachings of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

I claim:

1. A device comprising:
   a. a connection plate having a first surface and an opposing second surface separated by a thickness of the connection plate, wherein a portion of the thickness of the connection plate defines a first end and an opposing second end, wherein the first end is a free end, and wherein the connection plate is adapted to abut or attach to a support bracket of a brake assembly; and b. two or more spring arms connected to and extending from the second end of the connection plate at an angle, wherein each of the two or more spring arms includes a projection portion that extends from the second end of the connection plate and a brake pad portion that extends back toward the connection plate, and wherein the projection portion and the brake pad portion are connected by a biasing portion to form an angle between the projection portion and the brake pad portion, and wherein the brake pad portion that extends back towards the connection plate of each of the two or more spring arms is moved away from the connection plate during an applied force and provides an axial force towards the connection plate so that the angle between the projection portion and the brake pad portion increases and stores energy.

2. The device of claim 1, wherein the two or more spring arms contact a brake pad so that rotation along a longitudinal axis extending lengthwise through a midpoint of the brake pad is prevented.

3. The device of claim 2, wherein a first spring arm of the two or more spring arms maintains contact with the brake pad above the longitudinal axis of the brake pad and a second spring arm of the two or more spring arms maintains contact with the brake pad below the longitudinal axis of the brake pad.

4. The device of claim 1, wherein the projection portion and the brake pad portion connected by the biasing portion form an angle that is less than 180 degrees.

5. The device of claim 4, wherein the projection portion dudes a guide projection that is adapted to contact a projection of a support bracket of a brake assembly.

6. The device of claim 1, wherein the projection portion of each of the two or more spring arms includes a connection segment connected to and extending from the second end of the connection plate; an angled segment connected to and extending from the connection segment and generally angled toward another of the two or more spring arms; and a contact segment connecting the angled segment with the biasing portion.

7. The device of claim 6, wherein the brake pad portion of the two or more spring arms includes a body segment connected to and extending from the biasing portion back toward the connection plate, a transition segment connected to and extending from the body segment, and a curved segment extending from the transition segment, wherein the transition segment provides a transition from the body section that is generally straight to the curved segment.

8. The device of claim 7, wherein the biasing portion connects the contact segment and the body segment, forming an angle.

9. The device of claim 8, wherein during an applied force from a brake pad, the brake pad and spring arms are moved toward a rotor, so that the angle between the contact segment and the body segment increases and stores energy.

10. The device of claim 9, wherein the angle between the contact segment and the body segment increase to about 90° or more during the applied force.

11. The device of claim 9, wherein during the applied force, the contact portions of each spring arm are forced together and into contact with each other.

12. The device of claim 9, wherein during a release from the applied force from the brake pad, the two or more spring arms retract the brake pad and return to substantially similar angles between the contact segment and the body segment as prior to the applied force from the brake pad.

13. The device of claim 12, wherein each of the two or more spring arms generate a force of about 5 N or mote upon the release from the applied force from the brake pad.

14. The device of claim 7, wherein the curved segment has a length to height ratio of about 2:1 or more.

15. The device of claim 1, wherein the device is non-handed so that the device is adapted to be used with an inboard brake pad or an outboard brake pad.

16. The device of claim 1, wherein the device is generally symmetric relative to a horizontal median plane.

17. The device of claim 1, wherein the two of more spring arms have generally different lengths.

18. The device of claim 1, wherein the connection plate is adapted to be held in place by a brake pad clip having an extension for maintaining a position of the connection plate against a pressure plate side of a projection of a support bracket of a brake assembly.

19. A brake assembly comprising:
a. a caliper;
b. a support bracket having a leading end and a trailing end, wherein the leading end, the trailing end, or both, have one or more projections;
c. a rotor extending through the support bracket;
d. two or more brake pads located within the support bracket on opposing sides of the rotor; and
e. a pad retraction spring including:
  i. a connection plate having a first end and a second end, wherein the connection plate is located on a pressure plate side of the one or more projections of the support bracket; and
  ii. two or more spring arms connected to and extending from the second end of the connection plate, wherein the spring arms include two or more segments joined by a biasing portion and forming an angle;
    wherein the connection plate and at least a portion of the two or more spring arms are located on opposite sides of one of the two or more brake pads, and
    wherein during a brake apply, the two or more brake pads are pushed toward the rotor and the two or more spring arms provide an axial force along a rotor axis toward the connection plate.

20. The brake assembly of claim 19, wherein during a brake apply, the two or more brake pads apply a force to the two or more spring arms and cause the angle between the two or more segments to increase; and
wherein during a brake release, the two or more spring arms retract the two or more brake pads and return to the original angles between the two or more segments prior to the brake apply.

* * * * *

UNITED STATES PATENT AND TRADEMARK OFFICE
CERTIFICATE OF CORRECTION

| | | |
|---|---|---|
| PATENT NO. | : 9,670,977 B2 | Page 1 of 1 |
| APPLICATION NO. | : 14/483461 | |
| DATED | : June 6, 2017 | |
| INVENTOR(S) | : Brian Lewis Boyle | |

It is certified that error appears in the above-identified patent and that said Letters Patent is hereby corrected as shown below:

In the Claims

Column 19, Lines 31-32, delete "portion dudes a" and insert --portion includes a--

Column 20, Line 10, delete "or mote upon" and insert --or more upon--

Signed and Sealed this
Eighth Day of August, 2017

Joseph Matal
*Performing the Functions and Duties of the*
*Under Secretary of Commerce for Intellectual Property and*
*Director of the United States Patent and Trademark Office*